(12) United States Patent
Feng

(10) Patent No.: US 7,887,116 B2
(45) Date of Patent: Feb. 15, 2011

(54) VEHICLE OCCUPANT PROTECTION SYSTEM BY PIVOTING SEATS UPWARD IN CASE OF A CRASH

(76) Inventor: Chien-Chung Feng, 37, Alley 54, Lane 944, Zhongshan Road, Sec 2, Chunghua (TW)

( * ) Notice: Subject to any disclaimer, the term of this patent is extended or adjusted under 35 U.S.C. 154(b) by 123 days.

(21) Appl. No.: 12/442,509

(22) PCT Filed: Sep. 29, 2006

(86) PCT No.: PCT/CN2006/002569

§ 371 (c)(1),
(2), (4) Date: Mar. 23, 2009

(87) PCT Pub. No.: WO2008/052380

PCT Pub. Date: May 8, 2008

(65) Prior Publication Data

US 2010/0019555 A1    Jan. 28, 2010

(51) Int. Cl.
*B60N 2/02* (2006.01)
(52) U.S. Cl. .................. 296/65.12; 296/65.11; 296/68.1
(58) Field of Classification Search .............. 296/65.11, 296/65.12, 68.1, 187.03, 187.12; 297/216.18
See application file for complete search history.

(56) References Cited

U.S. PATENT DOCUMENTS

| 5,947,543 | A | * | 9/1999 | Hubbard | 296/68.1 |
| 6,092,853 | A | * | 7/2000 | Hubbard | 296/68.1 |
| 6,224,131 | B1 | * | 5/2001 | Shammout | 296/68.1 |
| 6,582,015 | B2 | * | 6/2003 | Jessup et al. | 296/68.1 |
| 6,854,782 | B2 | * | 2/2005 | Reichert et al. | 296/68.1 |
| 6,869,132 | B2 | * | 3/2005 | Wang et al. | 296/68.1 |
| 6,916,040 | B1 | * | 7/2005 | Levine | 296/68.1 |
| 7,159,923 | B2 | * | 1/2007 | Rajasingham | 296/68.1 |
| 2003/0038498 | A1 | * | 2/2003 | Rajasingham | 296/68.1 |

\* cited by examiner

*Primary Examiner*—Lori L Lyjak

(57) ABSTRACT

A vehicle occupant protection system in one embodiment includes a control device disposed in a front portion of a vehicle body; a plurality of first sensors mounted in the front portion of the vehicle body; two first actuators each mounted under a front seat equipped with a first seat belt; and a second actuator mounted under a rear seat equipped with a plurality of second seat belts; wherein each of the first sensors is adapted to detect a vehicle crash and send an activation signal to the control device when it occurs, and the activated control device is adapted to activate the first and second actuators to pivot the front and rear seats upward a predetermined angle to push seated vehicle occupants rearward.

9 Claims, 12 Drawing Sheets

VEHICLE OCCUPANT PROTECTION SYSTEM BY PIVOTING SEATS UPWARD IN CASE OF A CRASH

BACKGROUND OF THE INVENTION

1. Field of Invention

The invention relates to passenger vehicle safety devices and more particularly to a vehicle occupant protection system by, for example, pivoting front and rear seats upward rearward in case of a front crash so as to greatly reduce the risk of serious injury and even death.

2. Description of Related Art

It is known that a vehicle occupant may continue to move forward due to inertia force when a crash occurs. As a result, seated passengers may suffer injury or even death.

Conventionally, seat belt and air bag are the most widely used safety devices within a passenger vehicle. For a seat belt, it can protect a seat passenger from abrupt jolts when a crash occurs. For an air bag, it can inflate automatically within an automobile at the impact of a collision to protect passengers from being thrown forward.

However, serious injury and even death still occur in traffic accidents even seat belts and/or air bags are properly installed and used in automobiles. This means that seat belts and air bags used in combination with the seat belts still have many drawbacks.

One important thing to be considered is that vehicle occupants should be pulled away from any hard objects or surfaces inside a vehicle as far as possible in a crash. Thus, continuing improvements in the exploitation of vehicle occupant protection system are constantly being sought.

SUMMARY OF THE INVENTION

It is therefore one object of the invention to provide a vehicle occupant protection system by pivoting front and rear seats upward rearward in case of a front crash so as to pull vehicle occupants away from any hard objects or surfaces inside a vehicle as far as possible and thus greatly reduce the risk of serious injury and even death.

It is another object of the invention to provide a vehicle occupant protection system by pivoting both sides of a large rear seat toward center in case of a side crash so as to pull vehicle occupants away from any hard objects or surfaces inside a vehicle as far as possible and thus greatly reduce the risk of serious injury and even death.

In one aspect of the invention there is provided a vehicle occupant protection system comprising a control device disposed in a front portion of a vehicle body; a plurality of first sensors mounted in the front portion of the vehicle body; two first actuators each mounted under a front seat equipped with a first seat belt; and a second actuator mounted under a rear seat equipped with a plurality of second seat belts; wherein each of the first sensors is adapted to detect a vehicle crash and send an activation signal to the control device when it occurs, and the activated control device is adapted to activate the first and second actuators to pivot the front and rear seats upward a predetermined angle to push seated vehicle occupants rearward.

The above and other objects, features and advantages of the invention will become apparent from the following detailed description taken with the accompanying drawings.

DETAILED DESCRIPTION OF THE INVENTION

Figure 1:
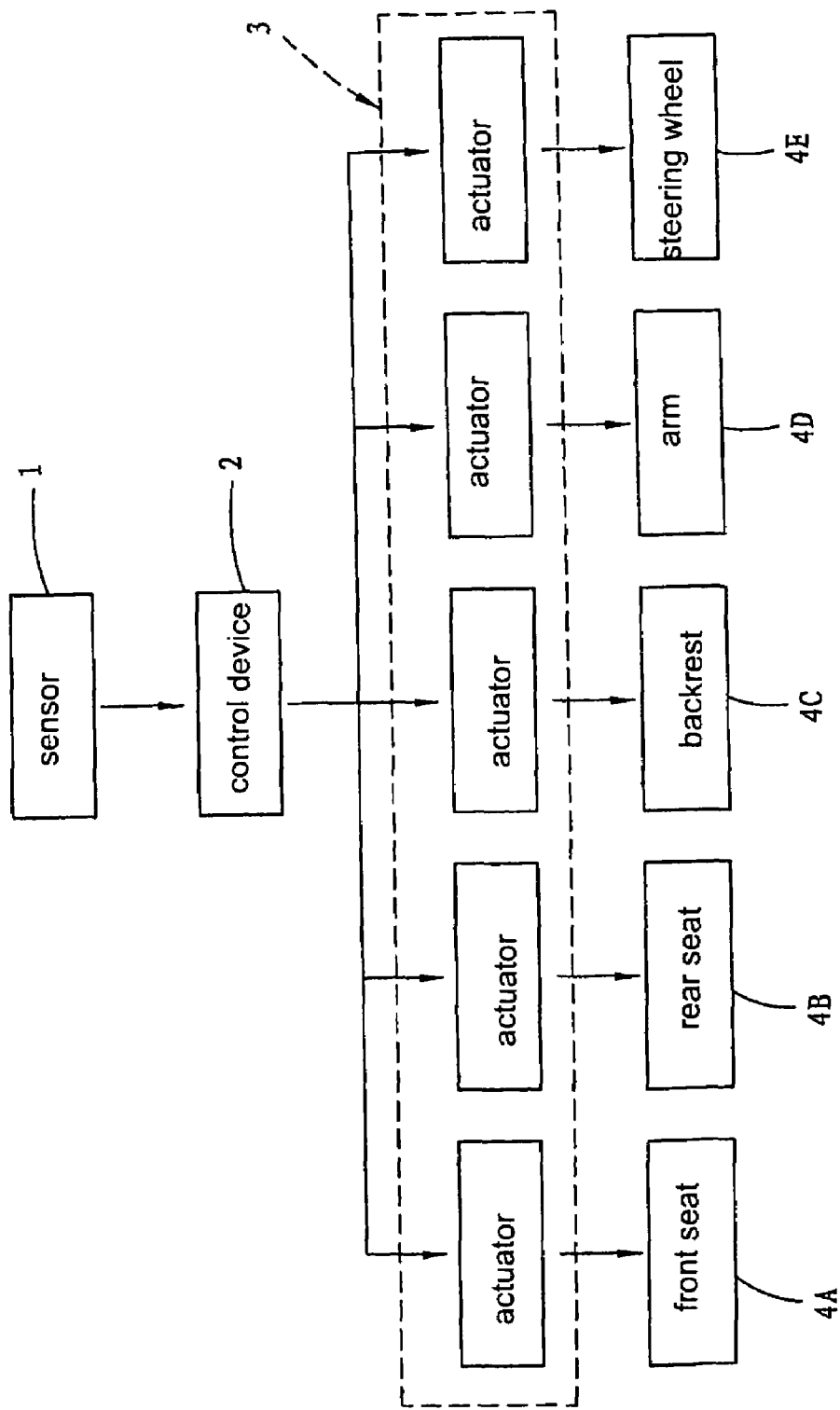
FIG. 1 is a block diagram of vehicle occupant protection system according to the invention.
Figure 2:
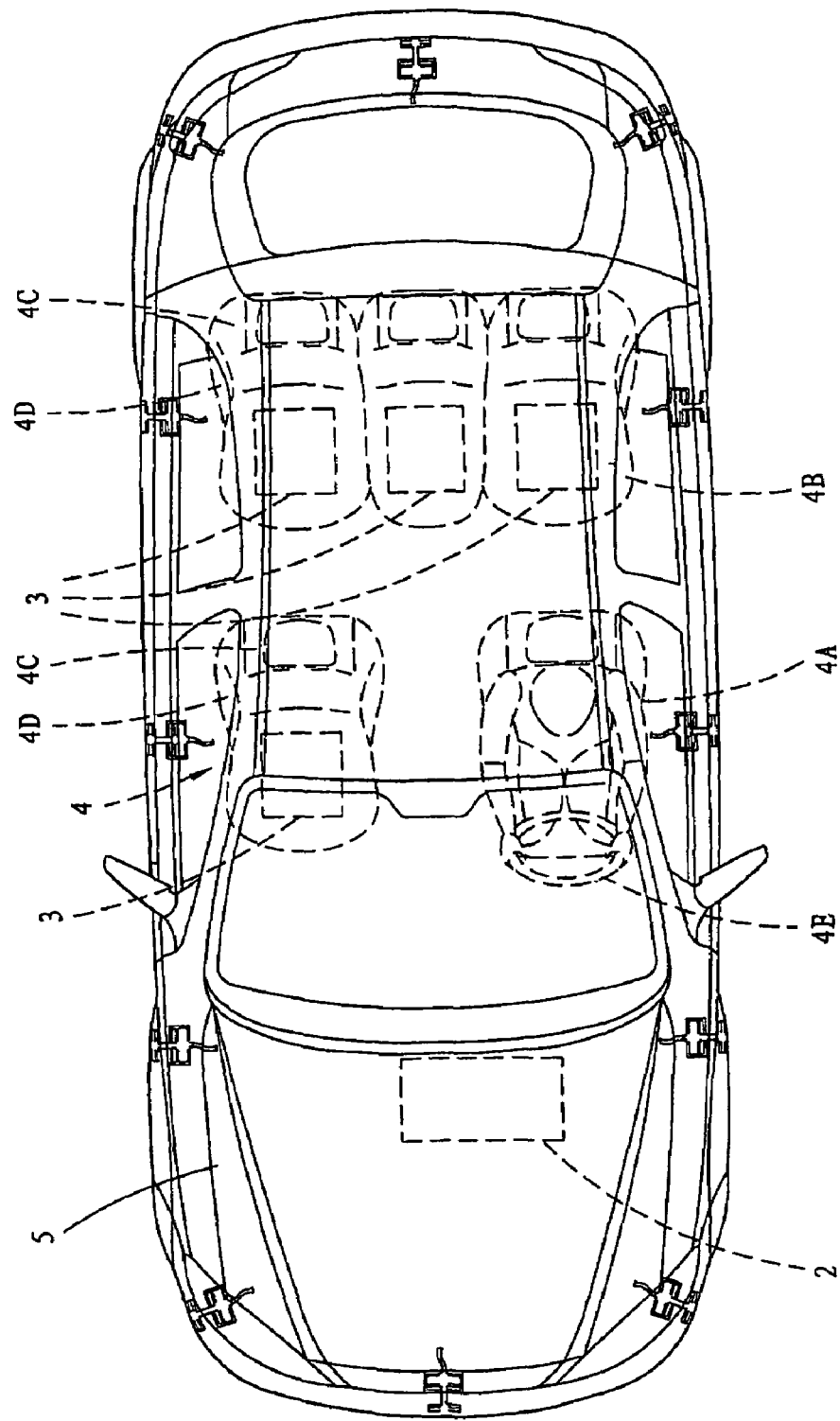
FIG. 2 a top plan view schematically showing an automobile equipped with the vehicle occupant protection system of FIG. 1.
Figure 3:
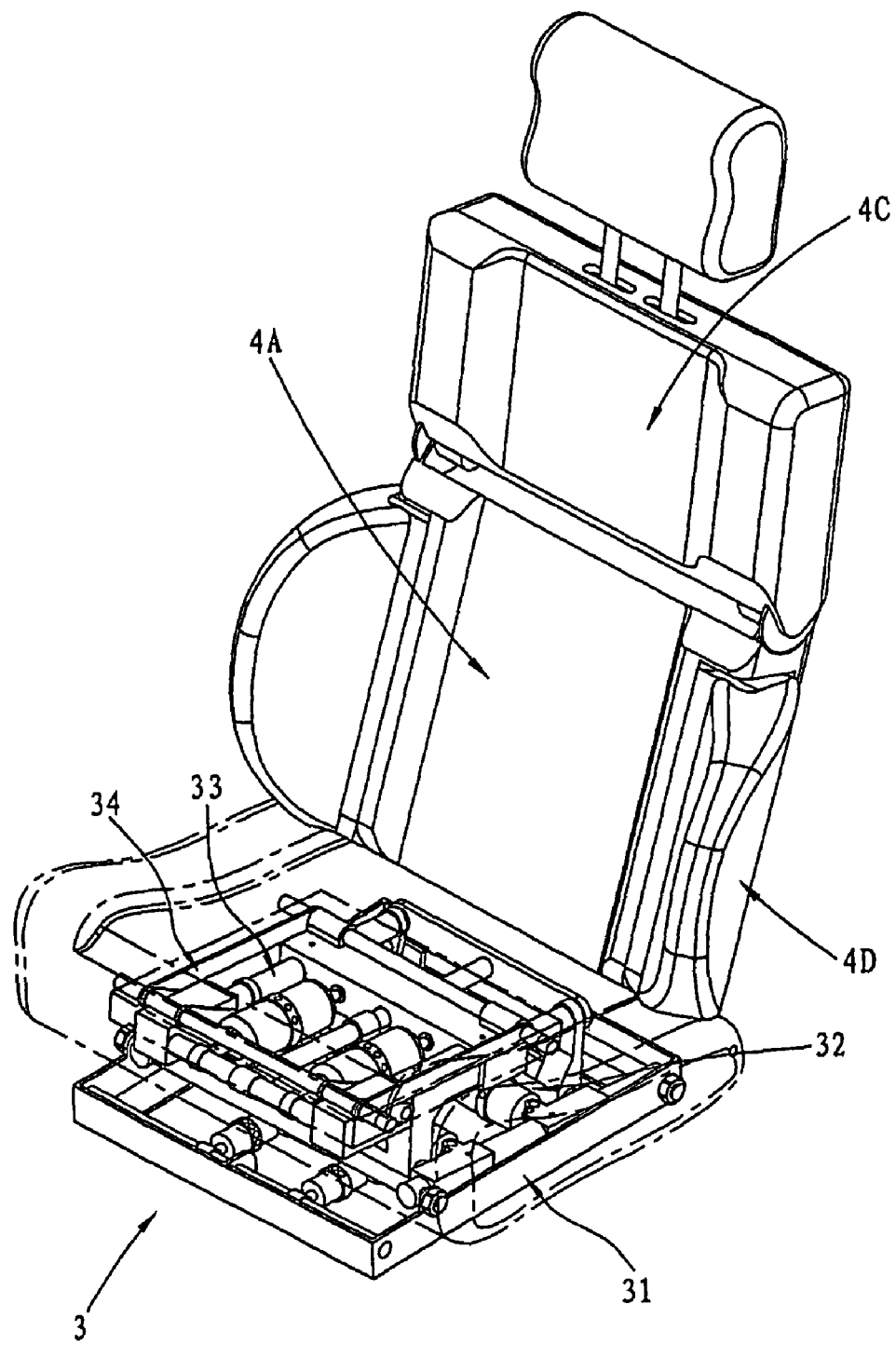
FIG. 3 is a perspective view of a front seat equipped with the actuator of the vehicle occupant protection system thereunder according to a first preferred embodiment of the invention.
Figure 4:
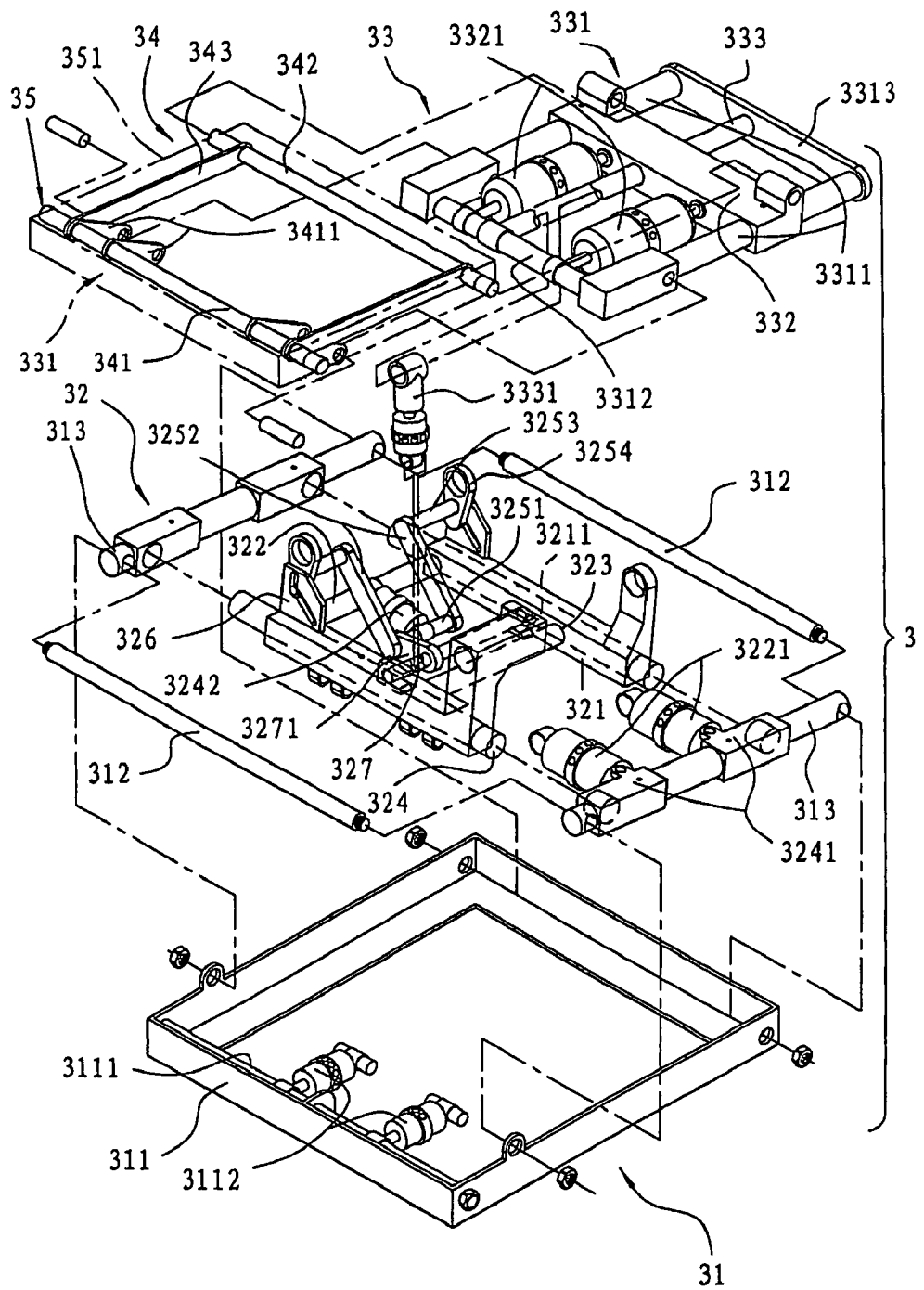
FIG. 4 is an exploded view of the actuator of FIG. 3.

Referring to FIGS. 1 and 2, a vehicle occupant protection system in accordance with the invention comprises the following components as discussed in detail below.

A sensor assembly comprises a plurality of sensors (e.g., electronic sensors) 1 mounted in front and rear portions of a vehicle body 5 and both sides thereof. The sensor 1 is adapted to detect a vehicle crash and further send an activation signal to a control device 2 when it occurs.

The control device 2 is implemented as a hydraulic pump and an electronic control unit (ECU) for controlling the activation of the hydraulic pump in this embodiment. The control device 2 is adapted to receive the activation signal from the sensor 1.

A plurality of actuators 3 are provided each mounted under a front seat 4A or a rear seat 4B. The actuators 3 are controlled by the control device 2 through a hydraulic arrangement in this embodiment. Alternatively, the actuators 3 are controlled by the control device 2 through a pneumatic arrangement, an electromagnetic arrangement, a linking mechanism or the like in other embodiments.

A plurality of driven devices 4 are provided and each is driven by the corresponding actuator 3. The driven devices 4 are comprised of two front seats 4A, three rear seats 4B, five backrests 4C, two pairs of arms 4D, and a steering wheel 4E.

Referring to FIGS. 3 to 7 in conjunction with FIGS. 1 and 2, the actuator 3 mounted under the front seat 4A according to a first preferred embodiment of the invention is shown.

The actuator 3 comprises a first unit 31 (i.e., base) including a rectangular frame element 311, a front bar 3111 provided proximate and behind a front end of the frame element 311, front and rear pivot rods 312, and two side rods 313 each mounted on one ends or the other ends of the pivot rods 312.

The actuator 3 further comprises a second unit 32 including two parallel hollow bars 321, a first link 322 interconnecting the parallel hollow bars 321, a spaced second link 323 interconnecting the parallel hollow bars 321, two cylindrical members 324 each provided through the parallel hollow bar 321, each cylindrical member 324 having one end secured to a sliding member 3241 on the side rod 313, two spaced second cylinders 3221 each pivotably secured to the sliding member 3241, two spaced first cylinders 3112 extending rearward from the front bar 3111 and pivotably secured to one adjacent hollow bar 321, a third cylinder 3242 pivotably secured to the first link 322, a first connecting rod 3251 pivotably secured to the third cylinder 3242, two slotted plates 326 each provided on the hollow bar 321 adjacent either end of the first link 322, two cavities 3211 each provided in an intermediate portion of the hollow bar 321, an operating rod 327 having both ends secured to the cavities 3211, the operating rod 327 having a member 3271, two first linking members 3252 having one ends pivotably secured to both ends of the first connecting rod 3251, two second linking members 3253 having one ends pivotably secured to the other ends of the first linking members 3252, and two ear members 3254 with the other ends of the second linking members 3253 secured thereto and adapted to slide in the slots of the plates 326.

The actuator 3 further comprises a third unit 33 including a frame member 331 having two parallel side bars 3311, a front bar 3312, and a rear bar 3313 all connecting together to form a rectangle; an intermediate guide bar 333 interconnecting the front and rear bars 3312, 3313; a sliding transverse member 332 pivotably put on the side bars 3311 and the guide bar 333; two fourth cylinders 3321 each having both ends connected to the front bar 3312 and the sliding transverse member 332; and a fifth cylinder 3331 slidably put on the guide bar 333.

The actuator 3 comprises a fourth unit 34 including two parallel front and rear bars 341, 342, two side plates 343 each interconnecting one ends of the front and rear bars 341, 342, and two pairs of yoke arms 3411 at both ends of the front bar 341. Both ends of the rear bar 342 are pivotably secured to the sliding transverse member 332. The pairs of yoke arms 3411 are pivotably secured to the side bars 3311.

The actuator 3 comprises a fifth unit 35 including a rectangular support frame 351 with both ends of each of the front and rear bars 341, 342 passing through.

Figure 5:
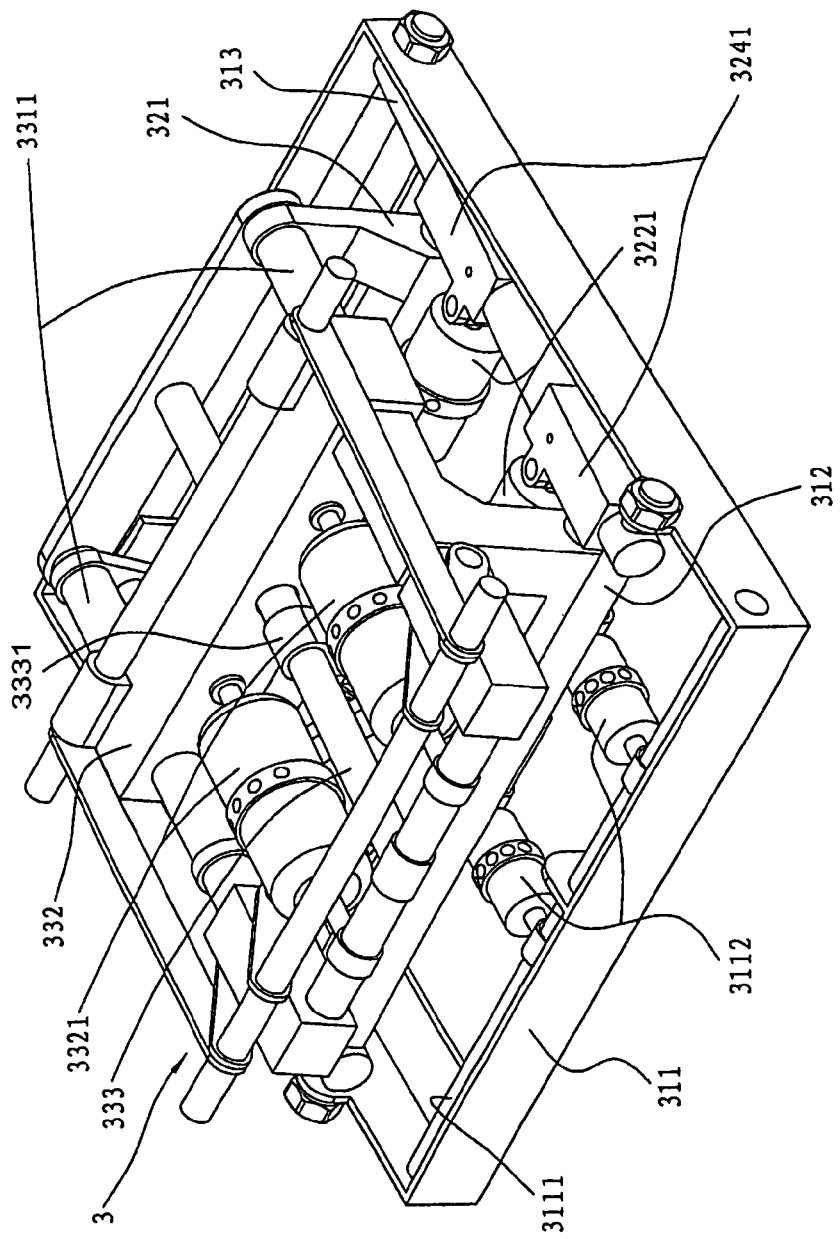
FIG. 5 is a perspective view of the assembled actuator of FIG. 4.
Figure 6:
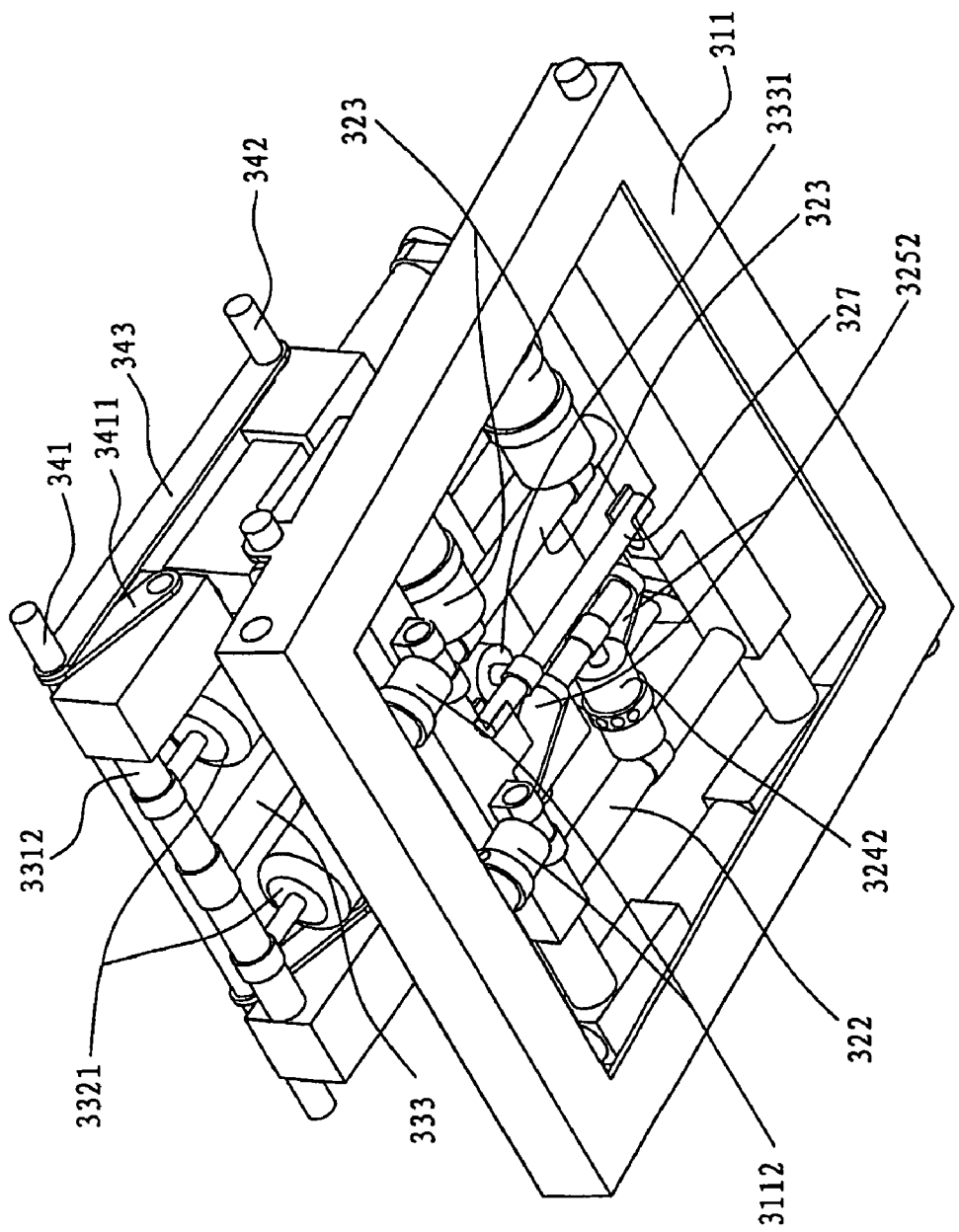
FIG. 6 is a view similar to FIG. 5 but viewed from bottom.
Figure 7:
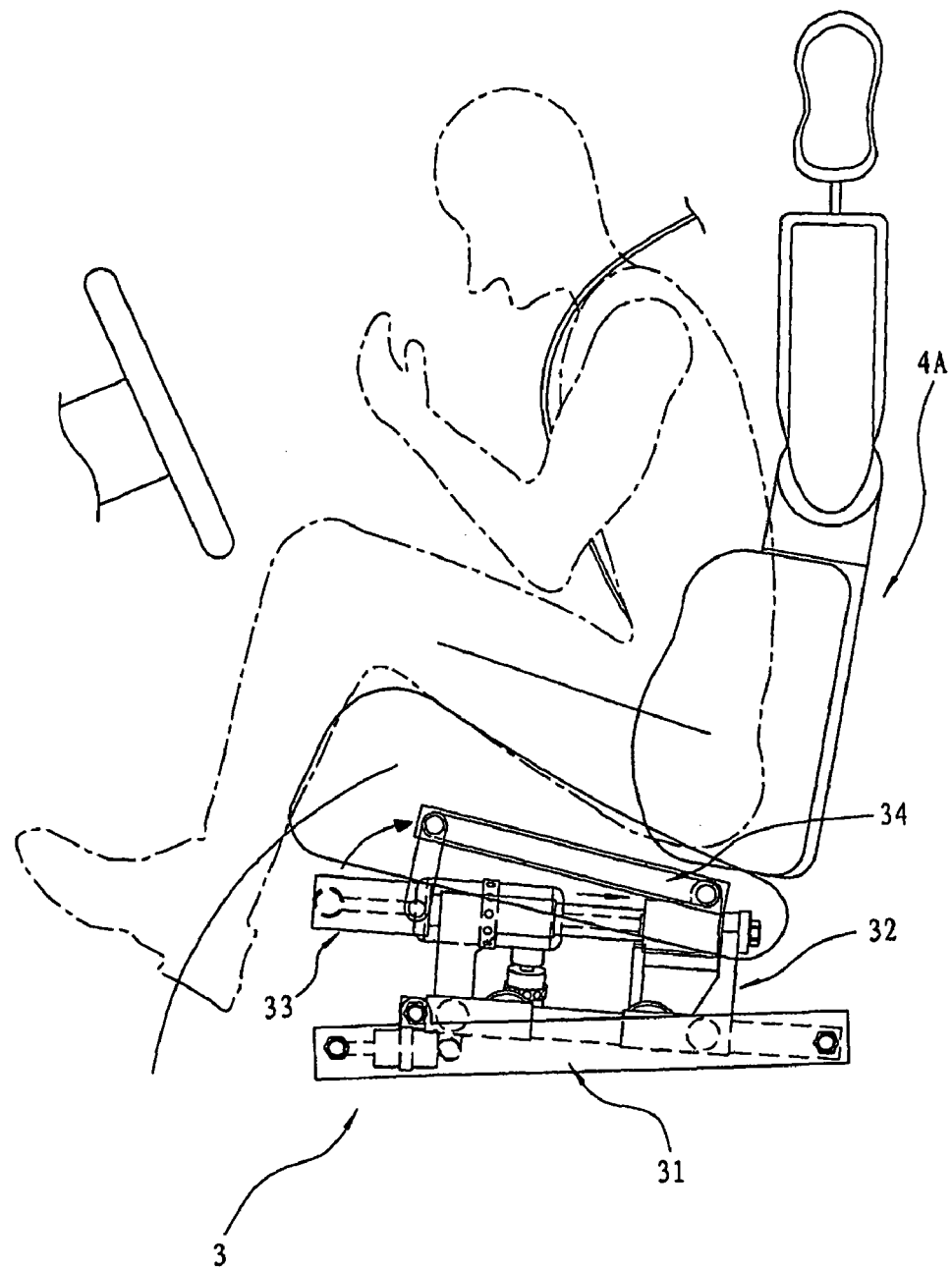
FIG. 7 is a side elevation showing the actuator being activated to upward pivot the front seat seated with a vehicle occupant in case of a crash.

Each of the cylinders 3112, 3221, 3242, 3321, and 3331 is implemented as a hydraulic cylinder. Further, each of the cylinders 3112, 3221, 3242, 3321, and 3331 has one or two extending piston rod. The assembled state of the actuator 3 is shown in FIGS. 5 and 6.

When a vehicle frontally crashes onto a rigid body, the sensor 1 in the front portion (e.g., under hood) of the vehicle body 5 may detect same almost at the same time. The sensor 1 then sends an activation signal to the control device 2 which in turn activates the actuator 3 under the front seat 4A by supplying pressurized hydraulic fluid thereto. And in turn, the piston rod of the first cylinder 3112 extends out of the first cylinder 3112 because the pressurized hydraulic fluid fed into the first cylinder 3112 pushes its piston rod outward. Next, the second unit 32 moves rearward due to the extending action of the piston rod of the first cylinder 3112.

The pressurized hydraulic fluid also feeds into the fourth cylinder 3321 to extend its piston rod. And in turn, the sliding transverse member 332 slides toward the rear bar 3313. And in turn, the fourth unit 34 moves rearward and pivots upward as indicated by arrows in FIG. 7. As a result, the seated passenger moves rearward and the seat thereunder pivots upward a predetermined angle. Both legs of the passenger move upward. This together with the restraining force of the seat belt can great decrease the forward movement of the passenger so as to protect the passenger at the moment of crash.

Referring to FIGS. 8 to 12 in conjunction with FIG. 1 to 7, the actuator 3 mounted under a large rear seat 4B according to a second preferred embodiment of the invention is shown.

The components of the actuator 3 mounted under the rear seat 4B are described below.

A first section 41 includes a rectangular case 411 having an open top and a transverse first rod 412.

A second section 42 is fitted in the first section 41. The second section 42 includes a rectangular frame element 421 having four walls 422 for dividing the second section 42 into three compartments (not numbered). Each wall 422 has a curved groove 423. The first rod 412 may pass the grooves 423 to allow the grooves 423 to slidably move about the first rod 412. Two spaced, inclined cylinders 424 are provided in the intermediate compartment and each has one end connected to the front end of the rectangular frame element 421 and the other end secured to the bottom of the rectangular frame element 421. Two longitudinal rods 425 are provided in both side compartments adjacent the two walls of the intermediate compartment.

A third section 43 includes an intermediate, rectangular frame member 431 and two side rectangular frame members 432 all being fitted in the three compartments of the second section 42. The side rectangular frame members 432 are mirror images each other. The side rectangular frame member 432 comprises two elongate, opposite front and rear openings 433 adjacent the intermediate rectangular frame member 431, and two opposite front and rear pivot links 434 distal the openings 433. The pivot links 434 are pivotably interconnected the side rectangular frame members 432 and the rectangular frame element 421. Each of the longitudinal rods 425 passes the aligned front and rear openings 433 to form a loose coupling thereto. The intermediate rectangular frame member 431 comprises two U-shaped rods 436 slidably passing both sides, each of the U-shaped rods 436 being further secured to one side of each of the side rectangular frame members 432, and two lateral cylinders 435 each provided between the side of the intermediate rectangular frame member 431 and the U-shaped rod 436.

Figure 8:
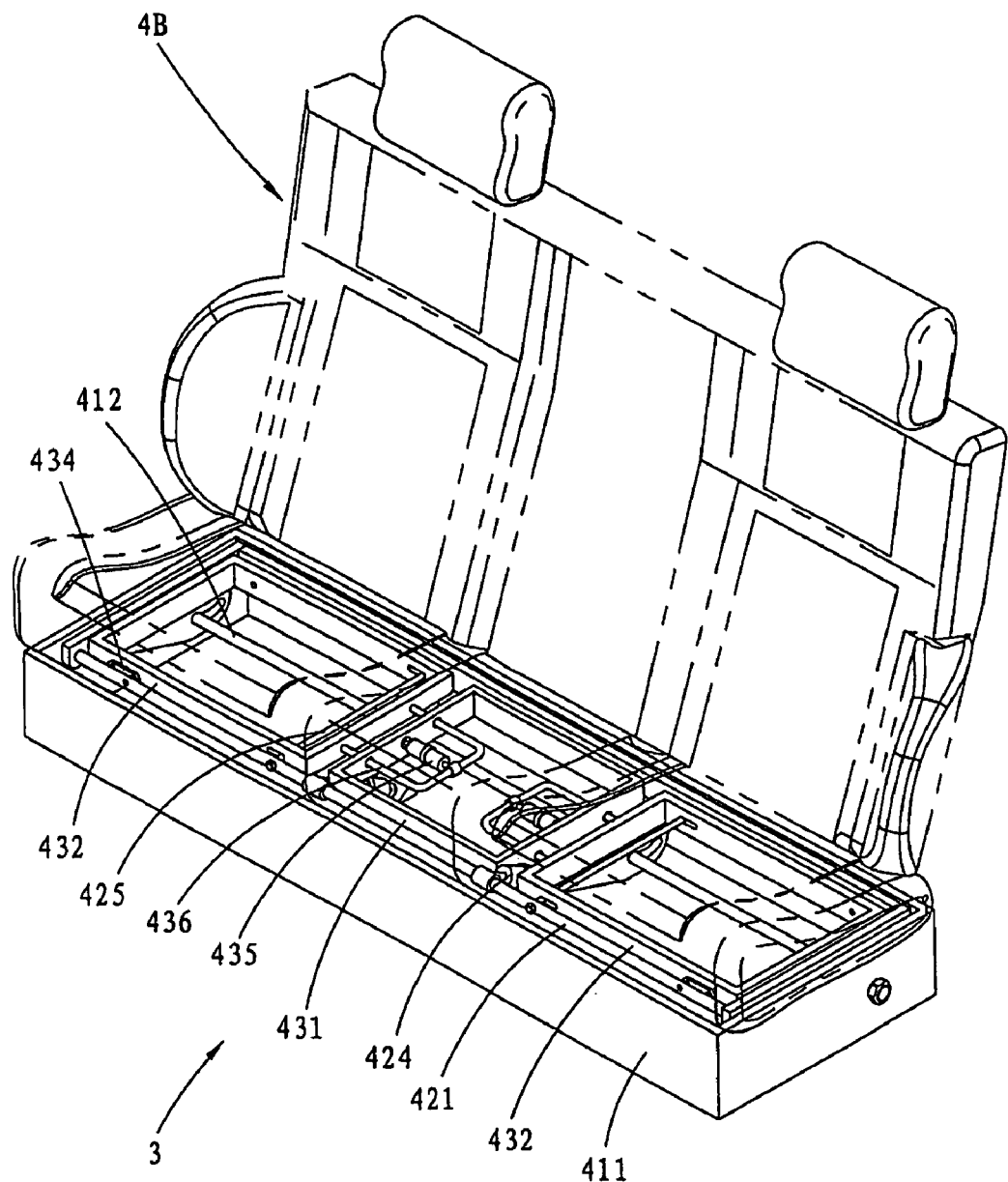
FIG. 8 is a perspective view of a large rear seat equipped with the actuator thereunder according to a second preferred embodiment of the invention.
Figure 9:
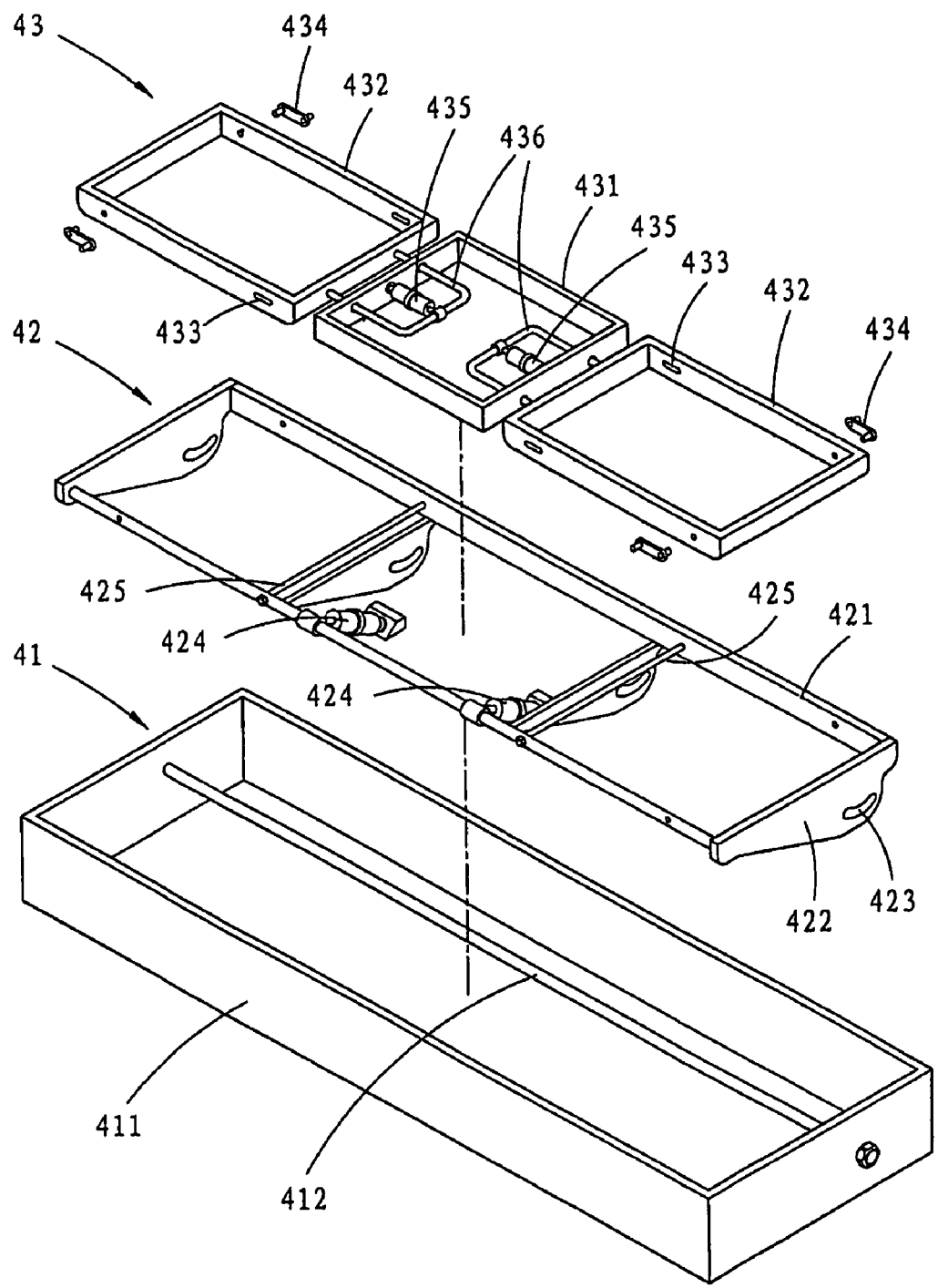
FIG. 9 is an exploded view of the frame of the rear seat of FIG. 8.
Figure 10:
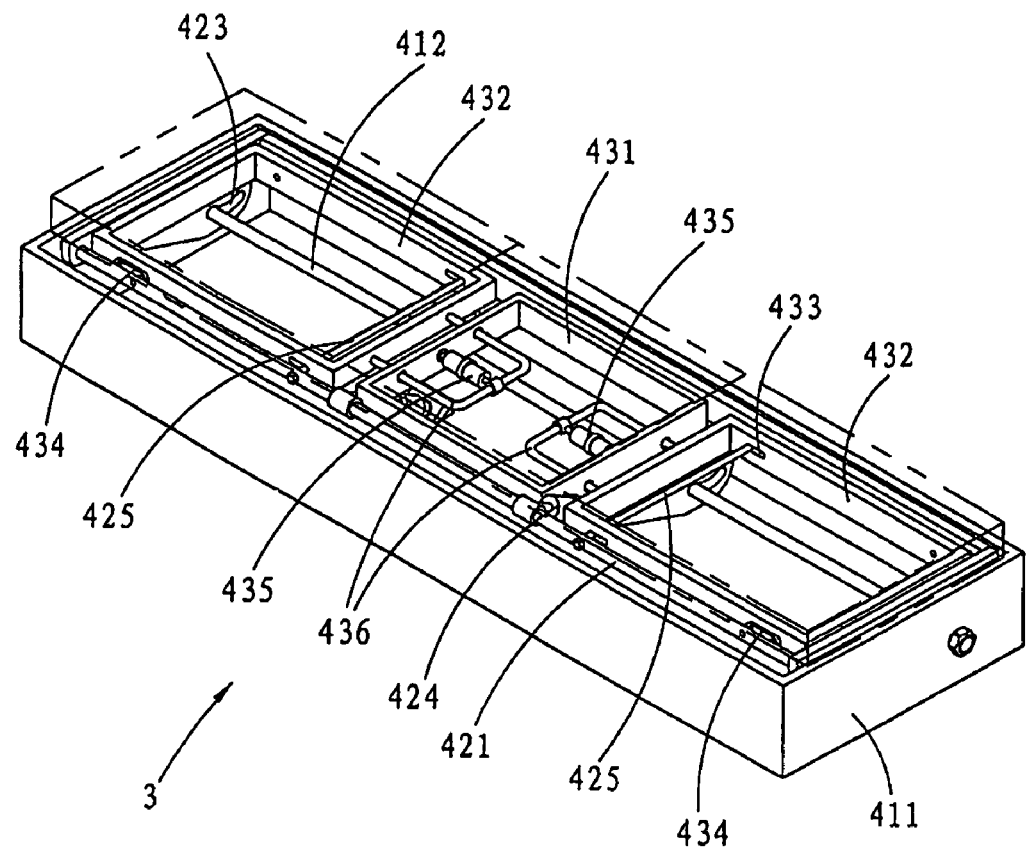
FIG. 10 is a perspective view of FIG. 8 with the backrest and the arms removed.
Figure 11:
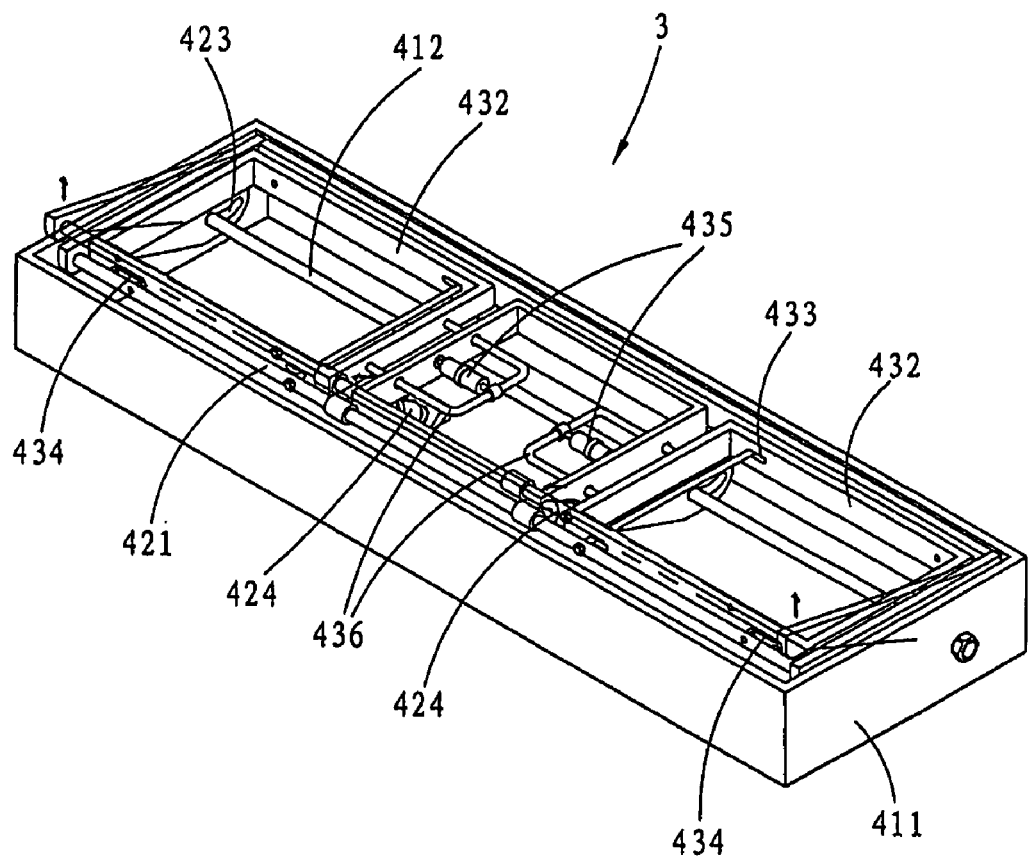
FIG. 11 is a view similar to FIG. 10 where the actuator is activated to pivot the front end of the frame of the rear seat upward in case of a crash.

Each of the cylinders 424 and 435 has one or two extending piston rod. The assembled state of the components of the actuator 3 under the rear seat 4B is shown in FIGS. 8 and 10.

When a vehicle frontally crashes onto a rigid body, the sensor 1 in the front portion of the vehicle body 5 may detect same almost at the same time. The sensor 1 then sends an activation signal to the control device 2 which in turn activates the actuator 3 under the rear seat 4B by supplying pressurized hydraulic fluid thereto. And in turn, the piston rods of the inclined cylinders 424 extend because the pressurized hydraulic fluid fed into the inclined cylinders 424 pushes its piston rods outward. Next, the front end of the rectangular frame element 421 pivots upward rearward as indicated by arrows in FIG. 11 due to the extending action of the piston rods of the inclined cylinders 424. As a result, the seated passenger moves rearward and the seat thereunder pivots upward a predetermined angle. Both legs of the passenger move upward. This together with the restraining force of the seat belt can great decrease the forward movement of the passenger so as to protect the passengers at the moment of crash.

Figure 12:
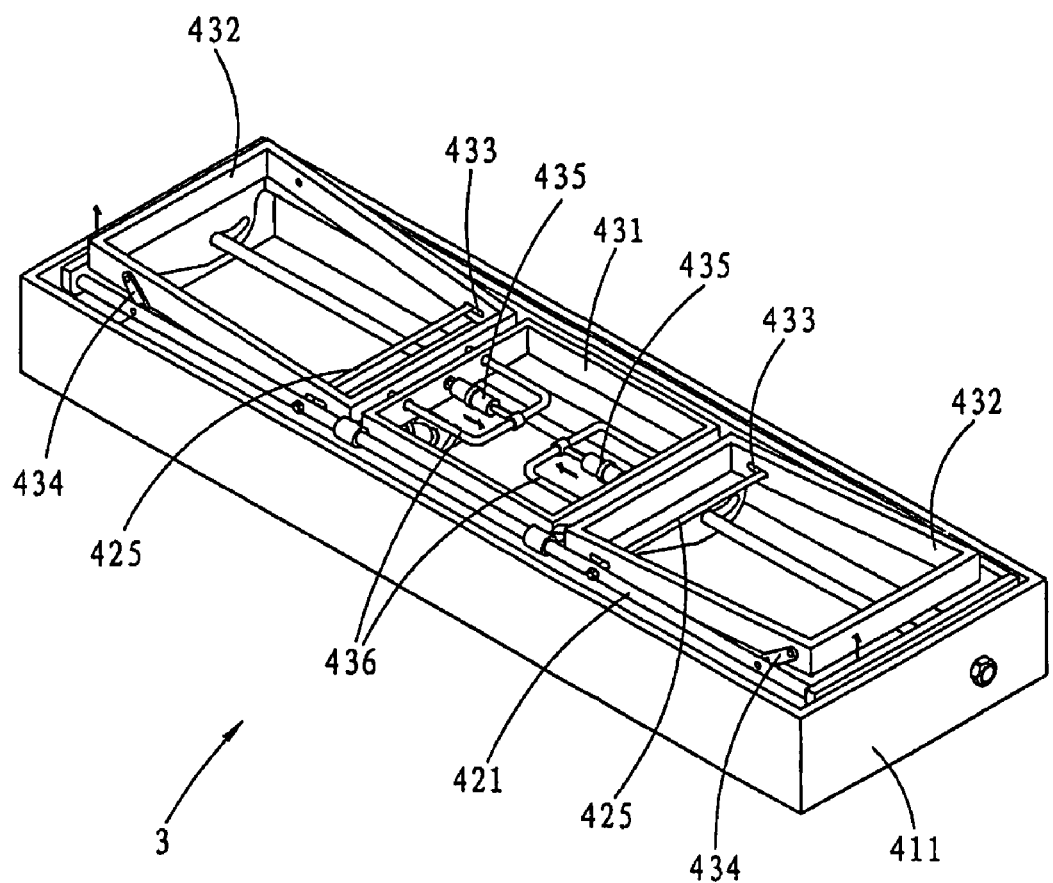
FIG. 12 is a view similar to FIG. 10 where the actuator is activated to pivot both sides of the frame of the rear seat upward inward in case of a crash.

Referring to FIG. 12 in conjunction with FIGS. 1, 2 and FIGS. 8 to 11, a side collision of a vehicle is described below. When another vehicle crashes onto either side of a vehicle, the sensor 1 in the collision side of the vehicle body 5 of the vehicle may detect same almost at the same time. The sensor 1 then sends an activation signal to the control device 2 which in turn activates the actuator 3 under the rear seat 4B by supplying pressurized hydraulic fluid thereto. And in turn, the piston rods of the lateral cylinders 435 extend out of the lateral cylinders 435 as indicated by two intermediate arrows in FIG. 12 because the pressurized hydraulic fluid fed into the lateral cylinders 435 pushes its piston rods outward. And in turn, the side rectangular frame members 432 move toward the intermediate, rectangular frame member 431. And in turn, the sides of the side rectangular frame members 432 distal the intermediate, rectangular frame member 431 move upward due to the cooperation of the pivot links 434 and the longitudinal rods 425 passing the openings 433 as indicated by two side arrows in FIG. 12. As a result, the seated passengers move toward center of the rear seat 4B and the sides of the rear seat 4B pivot upward a predetermined angle. This together with the restraining force of the seat belt can great decrease the forward and lateral movements of the rear seat passengers so as to protect the passengers at the moment of crash.

Alternatively, the vehicle occupant protection system is implemented as a pneumatic one in other embodiments. Thus, the control device 2 is implemented as an air compressor and an ECU for controlling the activation of the air compressor. Also, the cylinders are pneumatic cylinders.

While the invention herein disclosed has been described by means of specific embodiments, numerous modifications and variations could be made thereto by those skilled in the art without departing from the scope and spirit of the invention set forth in the claims.

What is claimed is:

1. A vehicle occupant protection system comprising:
   a control device disposed in a front portion of a vehicle body;
   a plurality of first electronic sensors mounted in the front portion of the vehicle body;
   a plurality of second electronic sensors mounted in both sides of the vehicle body;
   two first actuators each mounted under a front seat equipped with a first seat belt; and
   a second actuator mounted under a rear seat equipped with a plurality of second seat belts;
   wherein each of the first electronic sensors is adapted to detect a vehicle crash and send an activation signal to the control device when it occurs, each of the second electronic sensors is adapted to detect a vehicle crash and send an activation signal to the control device when it occurs, and the activated control device is adapted to activate the first and second actuators to pivot the front and rear seats upward a predetermined angle to push seated vehicle occupants rearward.

2. The vehicle occupant protection system of claim 1, wherein the second actuator comprises:
   a first section having an open top;
   a second section pivotably mounted in the first section and including first, second, and third compartments and two inclined cylinders each interconnecting the bottom of the second compartment and a front end thereof; and
   a third section including two side cases each having an open top and pivotably secured to either one of the first and third compartments; and an intermediate case having an open top and including two U-shaped rods each slidably passing both sides to secured to either side case, and two lateral cylinders each interconnecting the side the intermediate case and a longitudinal portion of the U-shaped rod.

3. The vehicle occupant protection system of claim 2, wherein the control device, in response to receiving an activation signal sent from one of the second electronic sensors, is adapted to activate the second actuator to pivot the outer sides of the side cases upward a predetermined angle and push the side cases toward the intermediate case in response to a side crash.

4. The vehicle occupant protection system of claim 2, wherein each of the inclined and lateral cylinders has one piston rod.

5. The vehicle occupant protection system of claim 2, wherein each of the inclined and lateral cylinders has two opposite piston rods.

6. The vehicle occupant protection system of claim 1, wherein each of the first and second actuators is controlled by the control device by means of a pneumatic arrangement.

7. The vehicle occupant protection system of claim 1, wherein each of the first and second actuators is controlled by the control device by means of an electromagnetic arrangement.

8. The vehicle occupant protection system of claim 1, wherein each of the first and second actuators is controlled by the control device by means of a linking mechanism.

9. The vehicle occupant protection system of claim 1, wherein each of the first and second actuators is controlled by the control device by means of a hydraulic arrangement.

* * * * *